US009299380B2

(12) United States Patent
Feldbaum et al.

(10) Patent No.: US 9,299,380 B2
(45) Date of Patent: Mar. 29, 2016

(54) APPARATUSES AND METHODS INCLUDING MAGNETIC LAYER OXIDATION

(71) Applicant: Seagate Technology LLC, Cupertino, CA (US)

(72) Inventors: Michael R. Feldbaum, San Jose, CA (US); Koichi Wago, Sunnyvale, CA (US); Bin Lu, San Ramon, CA (US); David S. Kuo, Palo Alto, CA (US)

(73) Assignee: Seagate Technology LLC, Cupertino, CA (US)

( * ) Notice: Subject to any disclaimer, the term of this patent is extended or adjusted under 35 U.S.C. 154(b) by 107 days.

(21) Appl. No.: 14/062,776

(22) Filed: Oct. 24, 2013

(65) Prior Publication Data
US 2015/0017483 A1 Jan. 15, 2015

Related U.S. Application Data

(60) Provisional application No. 61/844,428, filed on Jul. 10, 2013.

(51) Int. Cl.
| B44C 1/22 | (2006.01) |
| G11B 5/74 | (2006.01) |
| G11B 5/855 | (2006.01) |
| H01F 41/34 | (2006.01) |
| H01F 10/12 | (2006.01) |

(52) U.S. Cl.
CPC ............. *G11B 5/746* (2013.01); *G11B 5/855* (2013.01); *H01F 41/34* (2013.01); *H01F 10/123* (2013.01)

(58) Field of Classification Search
CPC .............. G11B 5/743; G11B 5/746; G11B 2005/0029; G11B 5/66; G11B 5/7325; B82Y 10/00; H01L 21/76819; H01L 21/31053; H01L 21/31055; H01L 21/31056; H01L 21/3212; H01L 27/11502; H01L 27/228; G11C 11/15
USPC .......... 438/631, 699, 3, 763, 782; 216/22, 38, 216/80; 365/158; 428/827, 828, 831, 834, 428/835, 848.5
See application file for complete search history.

(56) References Cited

U.S. PATENT DOCUMENTS

| 5,245,213 | A | * | 9/1993 | Huang .......................... 257/638 |
| 5,250,472 | A | * | 10/1993 | Chen et al. .................... 438/699 |
| 6,699,725 | B2 | * | 3/2004 | Lee .................................. 438/3 |
| 6,703,099 | B2 | * | 3/2004 | Belser .................... B82Y 10/00 428/827 |
| 8,557,403 | B2 | | 10/2013 | Schmid et al. |
| 2009/0317661 | A1 | * | 12/2009 | Sakurai .................. B82Y 10/00 428/800 |
| 2011/0164336 | A1 | * | 7/2011 | Hirayama et al. ............. 360/135 |
| 2012/0236694 | A1 | * | 9/2012 | Hellwig et al. ............ 369/13.33 |
| 2014/0044993 | A1 | * | 2/2014 | Li .......................... H04W 4/021 428/828 |

* cited by examiner

*Primary Examiner* — Nadine Norton
*Assistant Examiner* — Christopher Remavege

(57) ABSTRACT

Provided herein is a method including oxidizing tops of features of a patterned magnetic layer to form oxidized tops of the features; removing an excess of an applied first protective material down to at least the oxidized tops of the features to form a planarized layer; and applying a second protective material over the planarized layer.

20 Claims, 11 Drawing Sheets

APPARATUSES AND METHODS INCLUDING MAGNETIC LAYER OXIDATION

CROSS-REFERENCE TO RELATED APPLICATIONS

This application claims the benefit of U.S. Provisional Patent Application No. 61/844,428, filed Jul. 10, 2013, which is incorporated herein in its entirety.

DETAILED DESCRIPTION

In a following description, reference is made to the accompanying drawings, which form a part hereof, and in which is shown by way of illustration a specific example in which the embodiments may be practiced. It is to be understood that other embodiments may be utilized and structural changes may be made without departing from the scope.

General Overview

It should be noted that the descriptions that follow, for example, in terms of a method of BPM fabrication using a filler protective layer process is described for illustrative purposes and the underlying system can apply to any number and multiple types of magnetic recording patterns. In one embodiment, a method of BPM fabrication using a filler protective layer process can be configured using a cross-linked filler layer as a protective layer for etching BPM magnetic features. The method of BPM fabrication using a filler protective layer process can be configured to include an etched oxidized feature layer and can be configured to include an non-etched oxidized feature layer and an overlying, high anisotropy, continuous magnetic layer coupled granular/continuous layer (CGC) using the embodiments.

Figure 1:
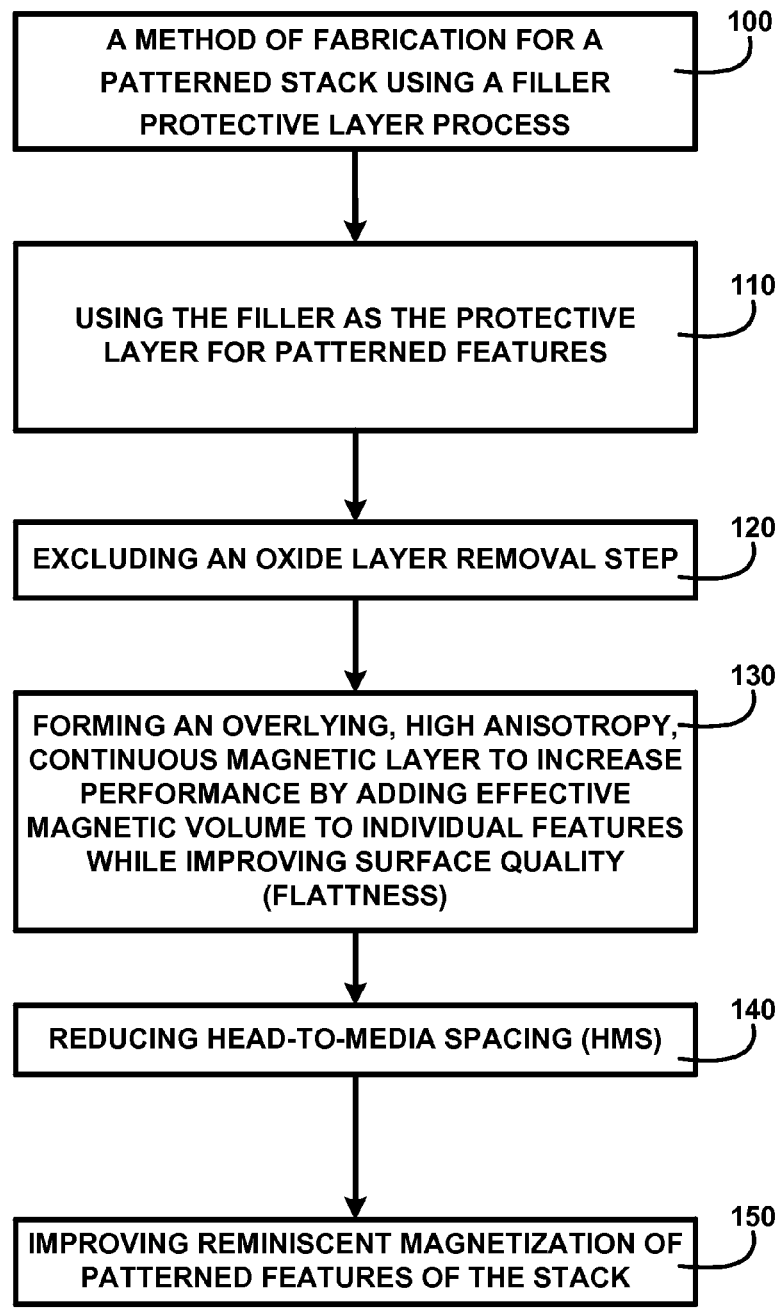
FIG. 1 shows a block diagram of an overview of a method of BPM fabrication using a filler protective layer process of one embodiment.

FIG. 1 shows a block diagram of an overview of a method of BPM fabrication using a filler protective layer process of one embodiment. FIG. 1 shows a method of BPM fabrication using a filler protective layer process 100. The method of BPM fabrication using a filler protective layer process 100 is a process for using the filler as the protective layer for sidewalls of individual patterned BPM features during the oxide removal from the individual patterned BPM features surface 110. The method of BPM fabrication using a filler protective layer process 100 enables excluding an oxide layer removal step 120 that can damage BPM features and magnetic materials thereof, including a reducing of the patterned volume.

The method of BPM fabrication using a filler protective layer process 100 includes an alternative process used for forming an overlying, high anisotropy, continuous magnetic layer, which improves media performance by adding effective magnetic volume to individual bits while making the surface completely flat 130. Improved surface topography improves fly-ability with reduced head-to-media spacing (HMS) 140. The method of BPM fabrication using a filler protective layer process 100 prevents damage to the BPM features and results in amplifying reminiscent magnetization of the BPM features in a BPM stack 150 of one embodiment.

DETAILED DESCRIPTION

Figure 2:
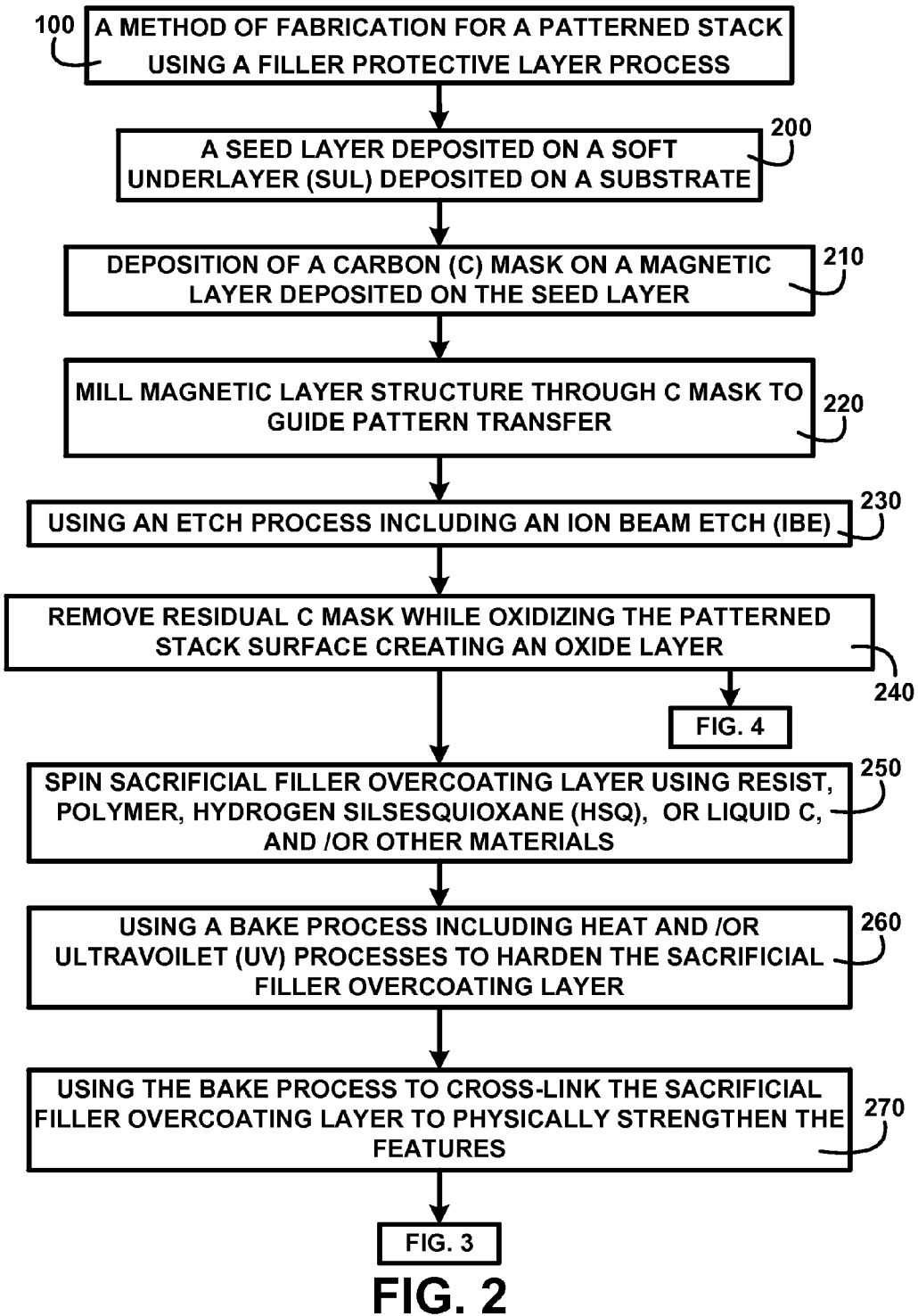
FIG. 2 shows a block diagram of an overview flow chart of a method of BPM fabrication using a filler protective layer process of one embodiment.

FIG. 2 shows a block diagram of an overview flow chart of a method of BPM fabrication using a filler protective layer process of one embodiment. FIG. 2 shows the method of BPM fabrication using a filler protective layer process 100, which includes the following steps: A seed layer is deposited on a soft underlayer (SUL) deposited on a substrate 200. A deposition of a carbon (C) mask on a magnetic layer deposited on the seed layer 210 is used in patterning processes. A process is used to mill the magnetic layer structure through the C mask to guide the BPM pattern transfer 220 including use of an etch process 230 selected from an ion beam etch (IBE), a focused ion beam (FIB) etch, a reactive ion beam etching (RIBE) process, and a chemically assisted ion beam etch (CAIBE) processes. An etch process is used to remove residual C mask while oxidizing the BPM patterned magnetic media surface creating an oxide layer 240. An alternative processing path is described in FIG. 4 of one embodiment.

The processing continues along this path and includes a process to spin a sacrificial filler overcoating layer using resist, polymer, hydrogen silsesquioxane (HSQ), or liquid C, and/or other materials 250. The sacrificial filler is used to protect the patterned BPM features during subsequent processing, to add robustness to the patterned bits, and to prevent bits dislocation and deforming. A process using a bake process including a heat and/or an ultra-violet (UV) process may be used to harden the sacrificial filler overcoating layer 260. The process may use the bake process to cross-link the sacrificial filler overcoating layer to physically strengthen the BPM features 270. Processing is further described in FIG. 3 of one embodiment.

Figure 3:
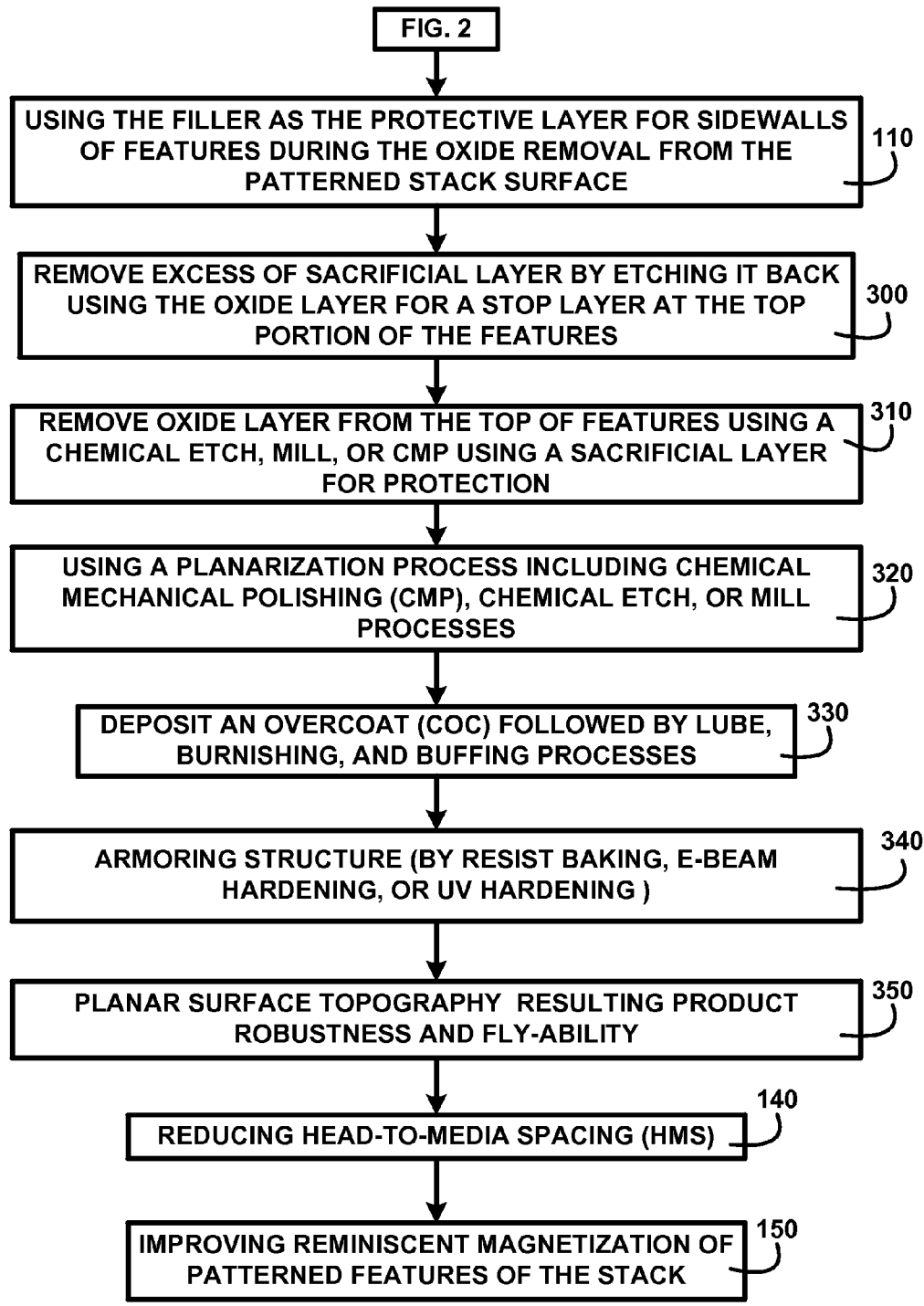
FIG. 3 shows a block diagram of an overview flow chart of using the filler as the protective layer of one embodiment.

FIG. 3 shows a block diagram of an overview flow chart of using the filler as the protective layer of one embodiment. FIG. 3 shows continuing from FIG. 2 processing using the filler as the protective layer for sidewalls of individual patterned BPM features during the oxide removal from the individual patterned BPM features surface 110. A process is also used to remove excess sacrificial layer by etching it back using the oxide layer as a stop layer at the top portion of the BPM features 300. The BPM features are protected from damage by the sacrificial layer of one embodiment.

A process to remove oxide layer from the top of bits may include using a chemical etch, mill, or CMP using a sacrificial layer for protection 310. The removal processes includes using a planarization process including chemical mechanical polishing (CMP), chemical etching, or mill processing 320. A deposition process is used to deposit an overcoat (COC) and is followed with lube, burnishing, and buffing processes 330. An armoring structure 340 (by resist baking, e-beam hardening, or UV hardening) is created to protect the BPM features during processing and results in a planar surface topography, product robustness, and improved fly-ability 350 with reduced head-to-media spacing (HMS) 140. The method of BPM fabrication using a filler protective layer process 100 is used for amplifying reminiscent magnetization of BPM features in a BPM stack 150 of one embodiment.

Figure 4:
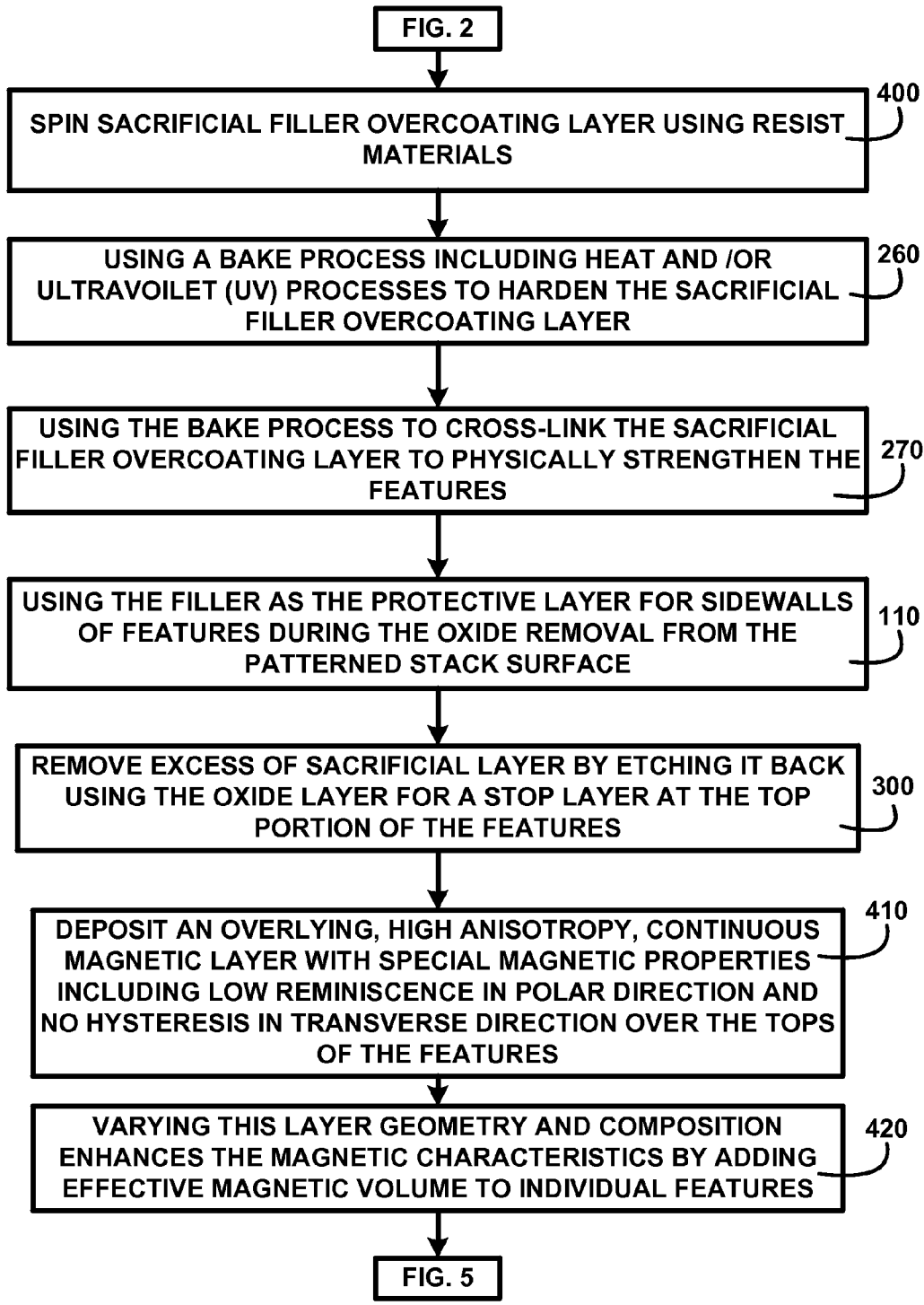
FIG. 4 shows a block diagram of an overview flow chart of depositing an overlying, high anisotropy, continuous magnetic layer of one embodiment.

FIG. 4 shows a block diagram of an overview flow chart of depositing an overlying, high anisotropy, continuous magnetic layer of one embodiment. FIG. 4 shows the alternative processing path continuing from FIG. 2. A process is used to spin sacrificial filler overcoating layer using resist materials 400. A bake process including a heat and/or an ultra-violet (UV) process may be used to harden the sacrificial filler overcoating layer 260. The bake process cross-links the sacrificial filler overcoating layer to physically strengthen the BPM features 270. Hardening and cross-linking enables using the filler as the protective layer for protection of sidewalls of individual patterned BPM features during the oxide removal from the individual patterned BPM features surface 110 of one embodiment.

A process is used to remove excess of sacrificial layer by etching it back using the oxide layer for a stop layer at the top portion of the BPM features 300. A deposition process is used to deposit an overlying, high anisotropy, continuous magnetic layer with special magnetic properties including low reminiscence in a polar direction (perpendicular to magnetic layer) and no hysteresis in a transverse direction (parallel to magnetic layer) over the tops of the bits 410. The deposition of the overlying, high anisotropy, continuous magnetic layer modifies a top surface of the individual patterned features and reduces head-to-media spacing while amplifying reminiscent magnetization of the patterned features of the stack. Varying this layer geometry and composition may enhance the magnetic characteristics by increasing an effective volume of magnetic material in individual bits 420 and can be done during the deposition process. Continuing descriptions of the process are shown in FIG. 5 of one embodiment.

Figure 5:
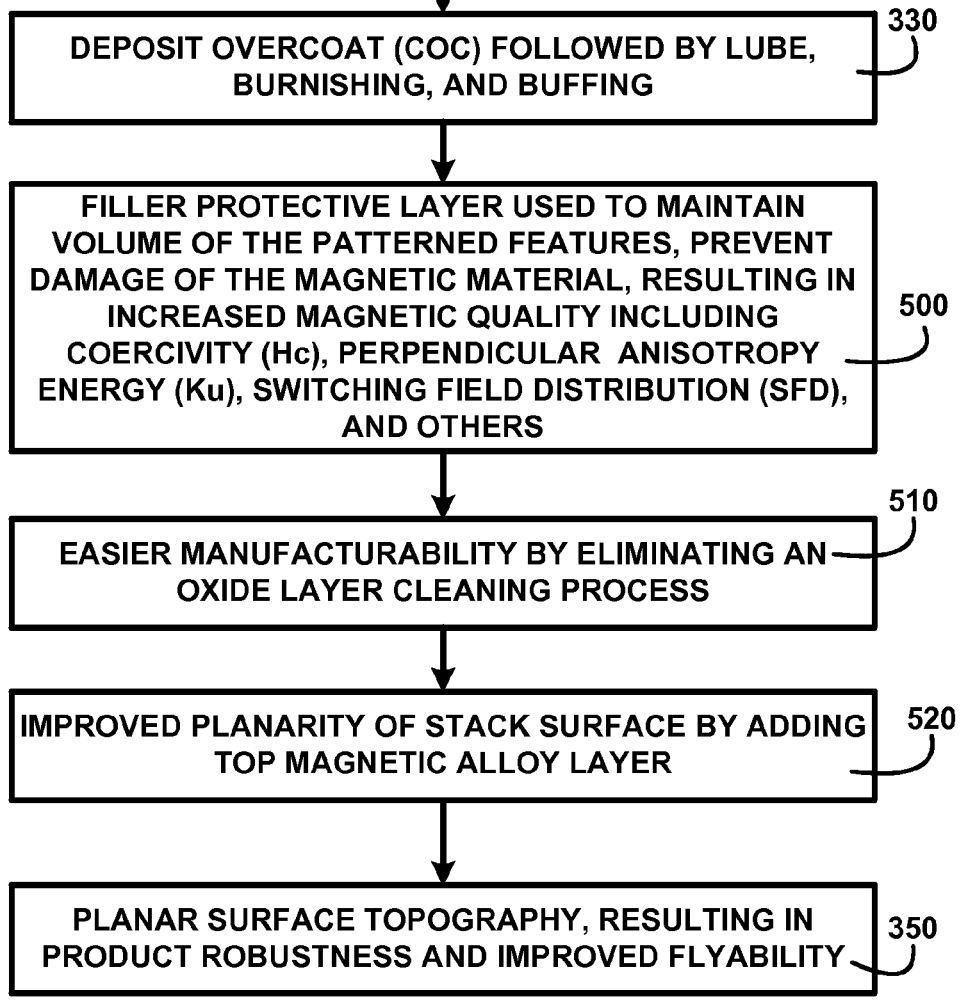
FIG. 5 shows a block diagram of an overview flow chart of BPM magnetic quality of one embodiment.

FIG. 5 shows a block diagram of an overview flow chart of BPM magnetic quality of one embodiment. FIG. 5 shows continuing from FIG. 4 the process to deposit an overcoat (COC) and is followed with lube, burnishing, and buffing processes 330. The filler protective layer is used to maintain the volume of the patterned BPM features and prevent damage of the magnetic materials, which results in amplified BPM magnetic quality including coercivity (Hc), perpendicular anisotropy energy (Ku), Switching Field Distribution (SFD), and others 500. The method of BPM fabrication using a filler protective layer process 100 of FIG. 1 produces improved manufacturability by eliminating an oxide layer cleaning process 510; improved surface topography; improved surface morphology by adding a top magnetic alloy layer 520; product robustness; and improved fly-ability 350 of one embodiment.

Figure 6:
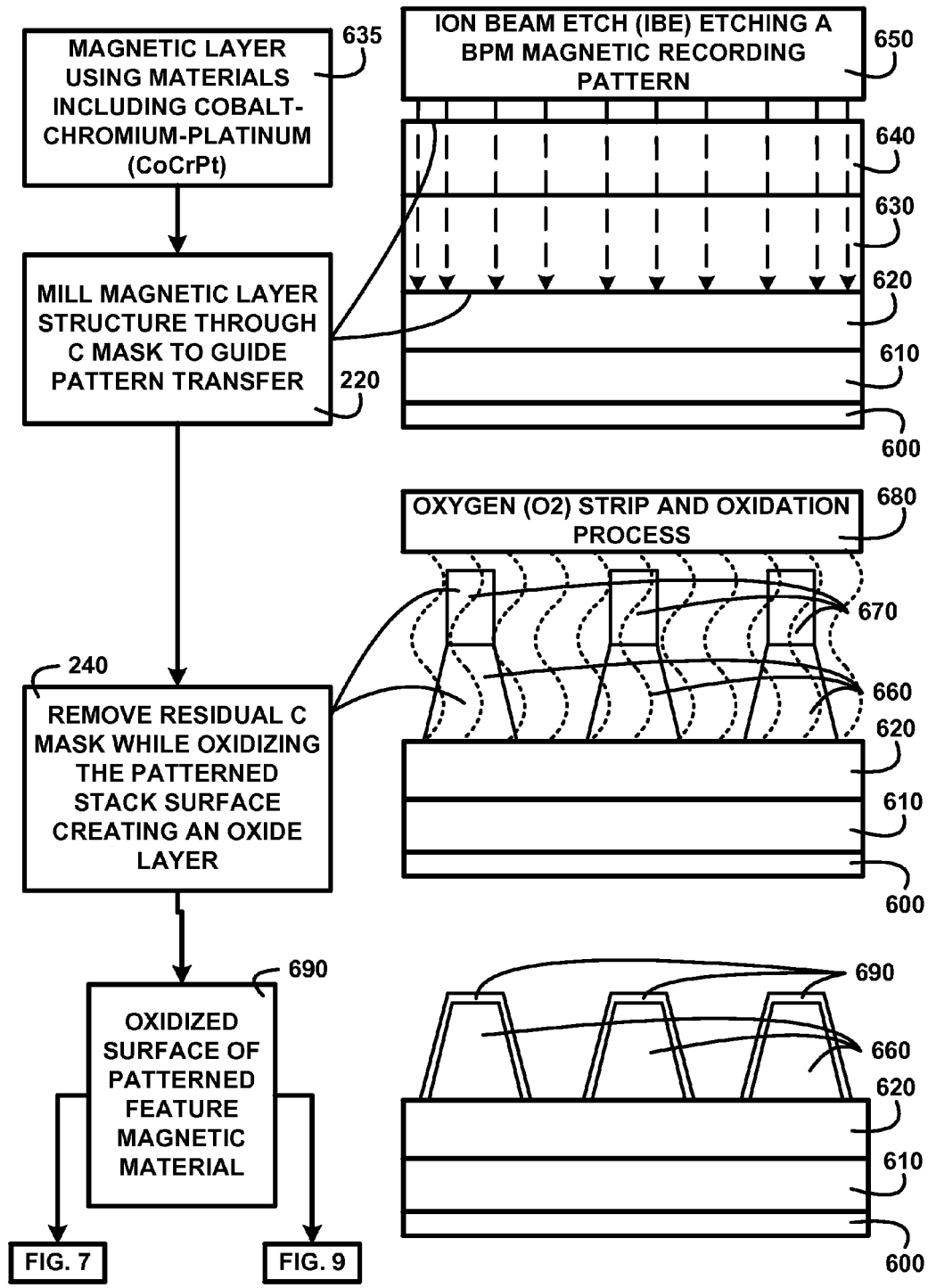
FIG. 6 shows for illustrative purposes only an example of an oxidized surface of BPM patterned features of one embodiment.

FIG. 6 shows for illustrative purposes only an example of an oxidized surface of BPM patterned feature of one embodiment. FIG. 6 shows a process to mill a magnetic layer structure through C mask to guide the BPM pattern transfer 220. The mill can include an ion beam etch (IBE) etching of a BPM magnetic recording pattern 650. The BPM pattern transfer is made through the carbon (C) mask layer 640 and into the magnetic layer 630 deposited onto a seed layer 620. The magnetic layer 630 is a magnetic layer using materials that may include cobalt-chromium-platinum (CoCrPt) 635. The seed layer 620 is deposited on a soft underlayer (SUL) 610 deposited on a substrate 600. The BPM pattern transfer creates BPM features with residual C mask material on top of one embodiment.

A process may be used including an oxygen ($O_2$) strip process 680 to remove residual C mask while oxidizing the BPM patterned magnetic media surface creating an oxide layer 240. The oxygen ($O_2$) strip process 680 removes the etched mask 670 residue and oxidizes the surfaces of etched magnetic BPM features 660 including those previously protected by the mask. An oxidized surface of patterned magnetic material 690 covers the etched magnetic BPM features 660. The processing continues in two configurations, the first is described in FIG. 7, and an alternative processing path is described in FIG. 9 of one embodiment.

Figure 7:
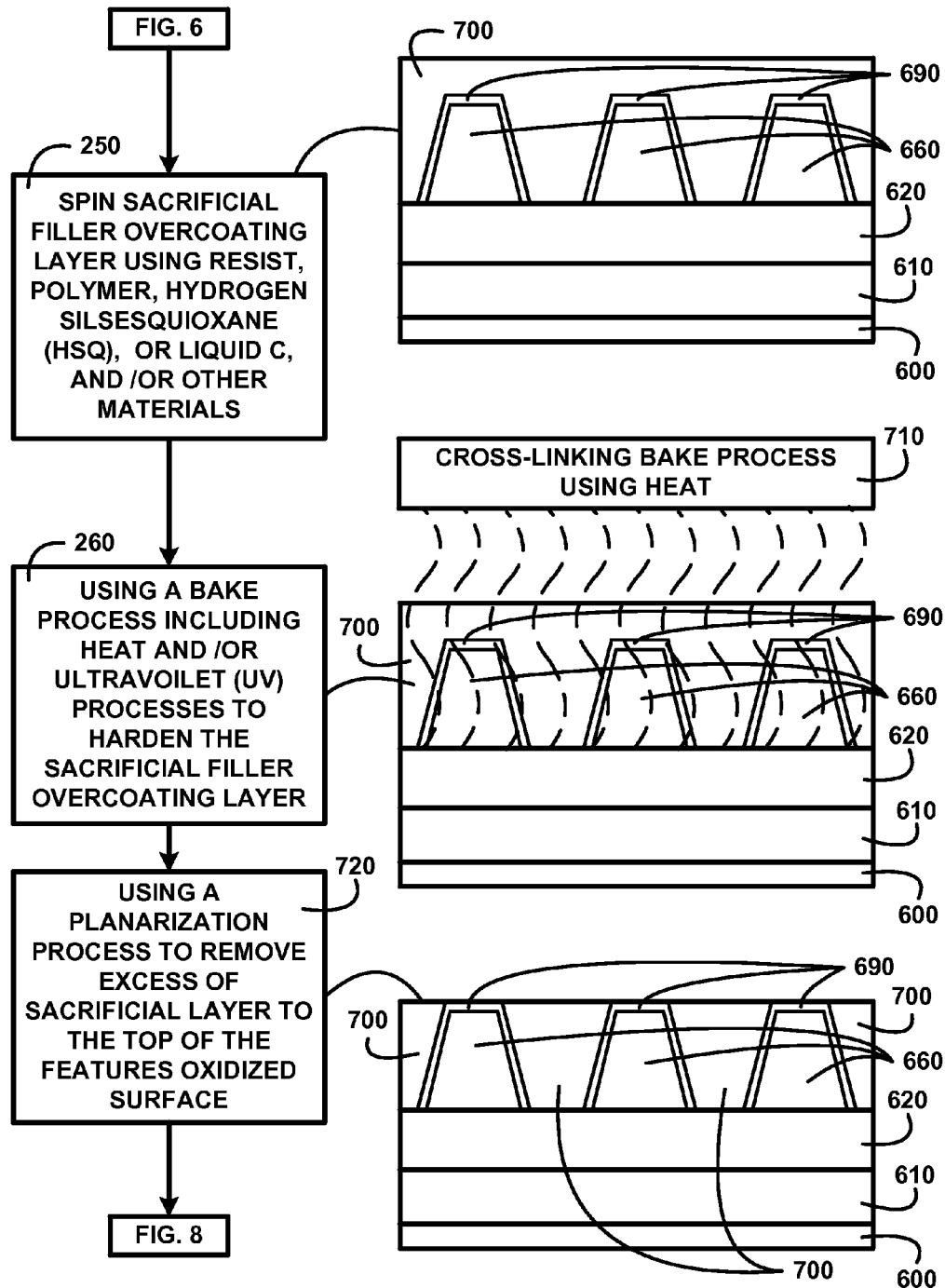
FIG. 7 shows for illustrative purposes only an example of removing excess sacrificial layer of one embodiment.

FIG. 7 shows for illustrative purposes only an example of removing excess sacrificial layer of one embodiment. FIG. 7 shows continuing from FIG. 6 the spin sacrificial filler overcoating layer using resist, polymer, hydrogen silsesquioxane (HSQ), or liquid C, and/or other materials 250, such as an HSQ sacrificial filler 700 layer. The HSQ sacrificial filler 700 covers the oxidized surface of patterned magnetic material 690 and exposed sections of the seed layer 620 surface. The HSQ sacrificial filler 700 may also cover the etched magnetic BPM features 660, substrate 600, and soft underlayer (SUL) 610 of one embodiment.

A bake process including heat and/or ultra-violet (UV) processes may be used to harden the sacrificial filler overcoating layer 260. A cross-linking bake process using heat 710 cross-links the HSQ sacrificial filler 700 with the oxidized surface of patterned magnetic material 690 and etched magnetic BPM features 660. The cross-linking protects the oxidized surface of patterned magnetic material 690 and etched magnetic BPM features 660 during subsequent processing. The bake process does not affect the substrate 600, soft underlayer (SUL) 610, and seed layer 620 of one embodiment.

The processing continues using a planarization process to remove excess sacrificial layer to the top of the BPM features oxidized surface 720. The oxidized surface of patterned magnetic material 690 and etched magnetic BPM features 660 are protected from damage or deterioration during the planarization process by the HSQ sacrificial filler 700. The processing continues and is described in FIG. 8 of one embodiment.

Figure 8:
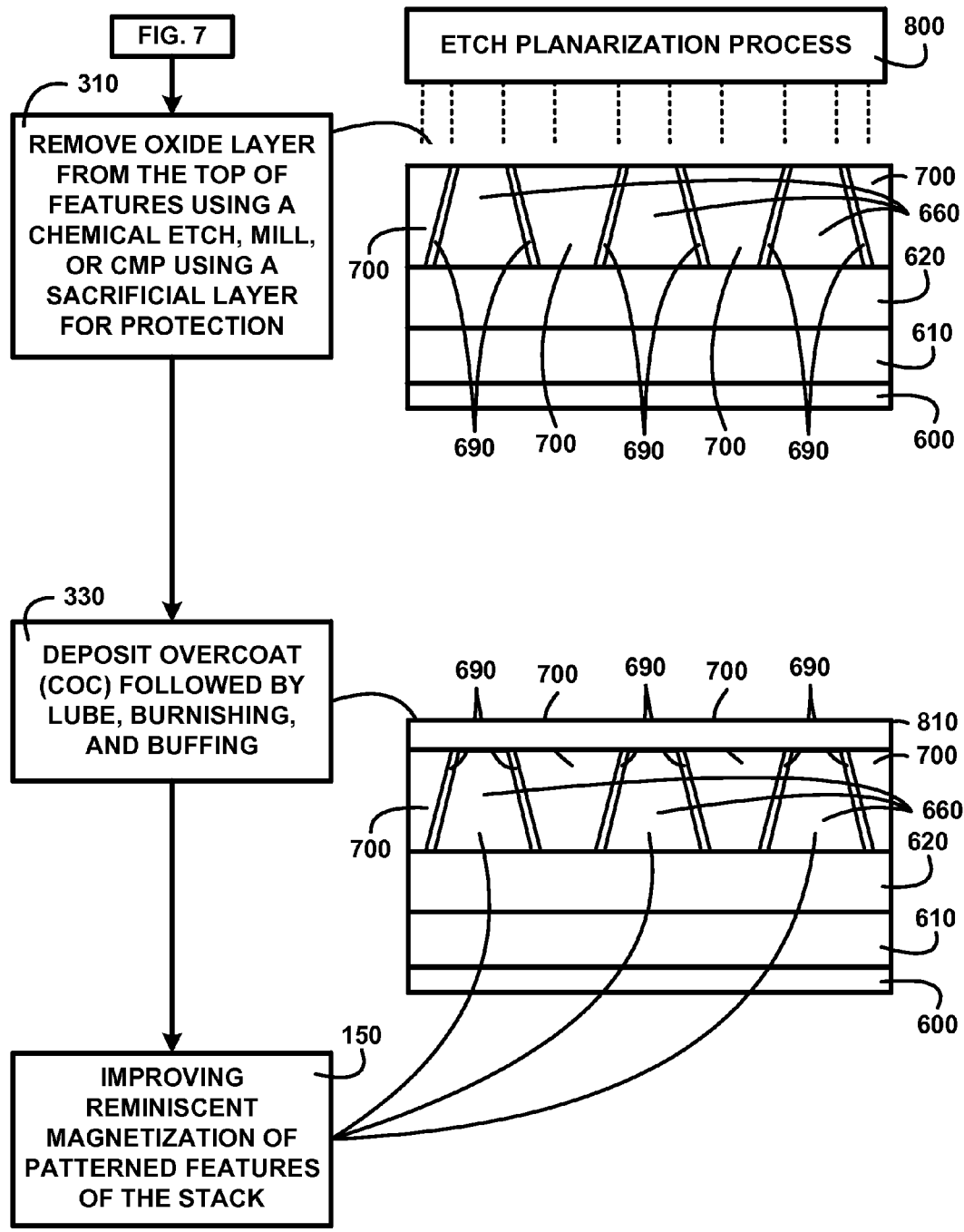
FIG. 8 shows for illustrative purposes only an example of removing oxide layer from the top of bits of one embodiment.

FIG. 8 shows for illustrative purposes only an example of removing oxide layer from the top of bits of one embodiment. FIG. 8 shows continuing from FIG. 7 a process to remove oxide layer from the top of bits using a chemical etch, mill, or CMP using a sacrificial layer for protection 310. An etch planarization process 800 removes the oxidized surface of patterned magnetic material 690 on the tops of the etched magnetic BPM features 660. The side walls of the etched magnetic BPM features 660 are protected by the HSQ sacrificial filler 700 during the etch planarization process 800. The substrate 600, soft underlayer (SUL) 610, and seed layer 620 are not affected by the etch planarization process 800 of one embodiment.

A deposition process is used to deposit an overcoat (COC) and is followed with lube, burnishing, and buffing processes 330. The COC 810 covers the planarized exposed sections of the patterned magnetic material 690, the etched magnetic BPM features 660, and the remaining HSQ sacrificial filler 700. Protecting the etched magnetic BPM features 660 during processing prevents processing-incurred structural damage of BPM features in a BPM stack 150 of one embodiment.

Figure 9:
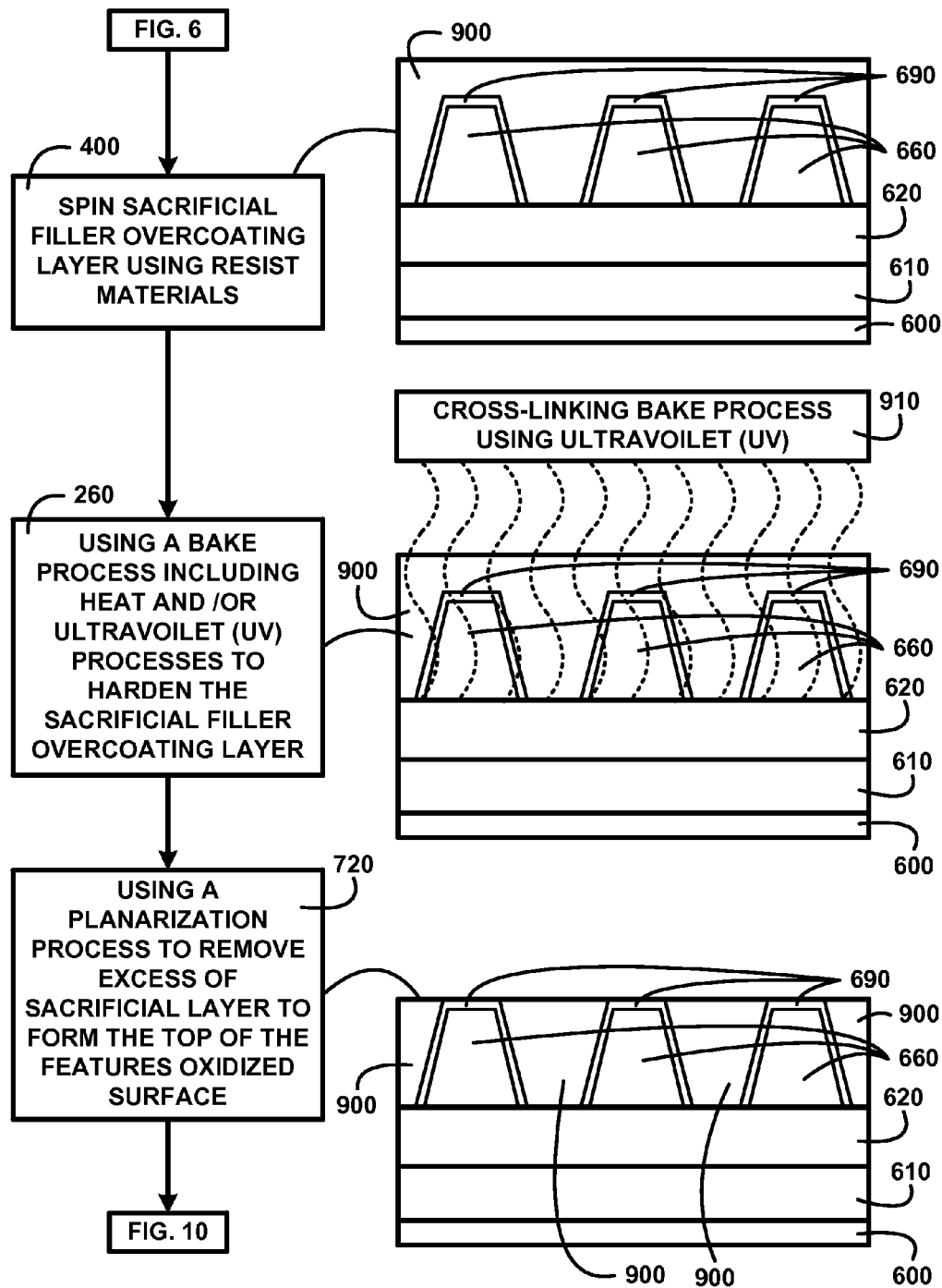
FIG. 9 shows for illustrative purposes only an example of cross-linking bake process of one embodiment.

FIG. 9 shows for illustrative purposes only an example of cross-linking bake process of one embodiment. FIG. 9 shows alternative processes continuing from FIG. 6. The sacrificial filler overcoating layer using resist materials 400 is used to spin the resist sacrificial filler 900 on the exposed surfaces of the seed layer 620 and surrounding the oxidized surface of patterned magnetic material 690. The resist sacrificial filler 900 covers the etched magnetic BPM features 660, the underlying substrate 600, the soft underlayer (SUL) 610, and the seed layer 620 of one embodiment.

The process continues using a bake process including heat and/or ultra-violet (UV) processes to harden the sacrificial filler overcoating layer 260. The bake process includes a cross-linking bake process using ultra-violet (UV) 910 to cross-link the resist sacrificial filler 900 over the oxidized surface of patterned magnetic material 690 and the etched magnetic BPM features 660. The bake process does not affect the substrate 600, the soft underlayer (SUL) 610, the and seed layer 620 of one embodiment.

The process includes using a planarization process to remove excess of sacrificial layer from the top of the BPM features oxidized surface 720. The oxidized surface of patterned magnetic material 690 and etched magnetic BPM features 660 are protected by the resist sacrificial filler 900 during the planarization process. The alternative processing is further described in FIG. 10 of one embodiment.

Figure 10:
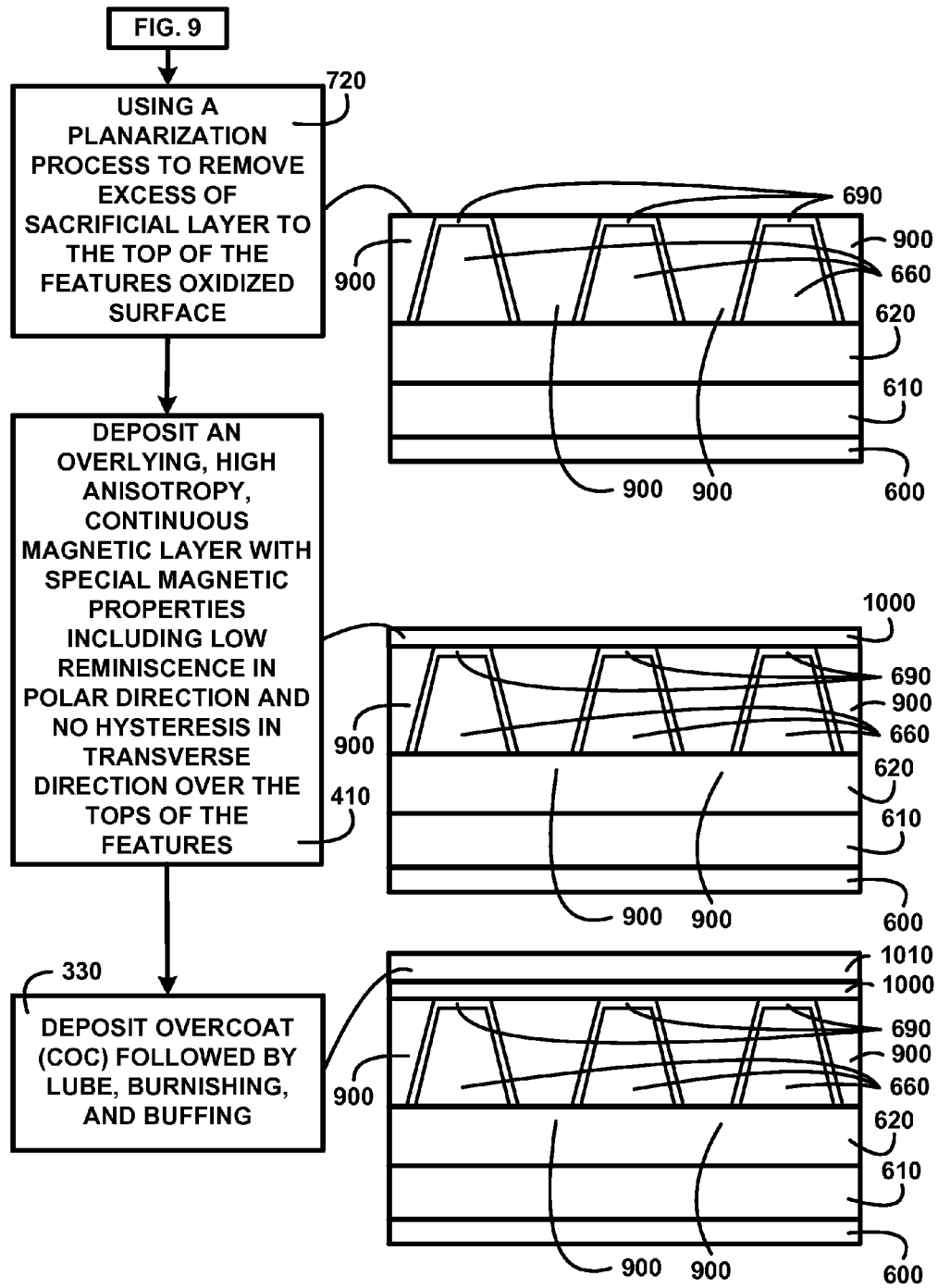
FIG. 10 shows for illustrative purposes only an example of depositing overlying, high anisotropy, continuous magnetic layer(s) of one embodiment.

FIG. 10 shows for illustrative purposes only an example of depositing overlying, high anisotropy, continuous magnetic layer(s) of one embodiment. FIG. 10 shows the process continuing from FIG. 9 using a planarization process to remove excess of sacrificial layer to the top of the BPM features oxidized surface 720. The planarization process leaves the resist sacrificial filler 900 surrounding the side walls of the etched magnetic BPM features 660 and the tops of patterned magnetic material 690. The planarization process does not affect the substrate 600, the soft underlayer (SUL) 610, and the seed layer 620 of one embodiment.

A deposition process is used to deposit an overlying, high anisotropy, continuous magnetic layer with special magnetic properties including low reminiscence in a polar direction (perpendicular to magnetic layer) and no hysteresis in a transverse direction (parallel to magnetic layer) over the tops of the bits 410. The overlying, high anisotropy, continuous magnetic layer 1000 is deposited on top of the patterned magnetic material 690 and remaining resist sacrificial filler 900. A deposition process is used to deposit an overcoat (COC) and is followed with lube, burnishing, and buffing processes 330. The COC 1010 is deposited on the overlying, high anisotropy, continuous magnetic layer 1000 of one embodiment.

Protecting the etched magnetic BPM features 660 during processing increases un-damaged volume of magnetic material in individual bits by preventing damage induced by processing. The increased volume and damage prevention along with the overlying, high anisotropy, continuous magnetic layer 1000 results in increased BPM magnetic quality including coercivity (Hc), perpendicular anisotropy energy (Ku), Switching Field Distribution (SFD), and others 500 of FIG. 5. The foregoing may also result in improved manufacturability by eliminating an oxide layer cleaning process 510 of FIG. 5; improved surface topography; improved surface morphology by adding a top magnetic alloy layer 520 of FIG. 5; and product robustness and fly-ability 350 of FIG. 3 of one embodiment.

Figure 11A:
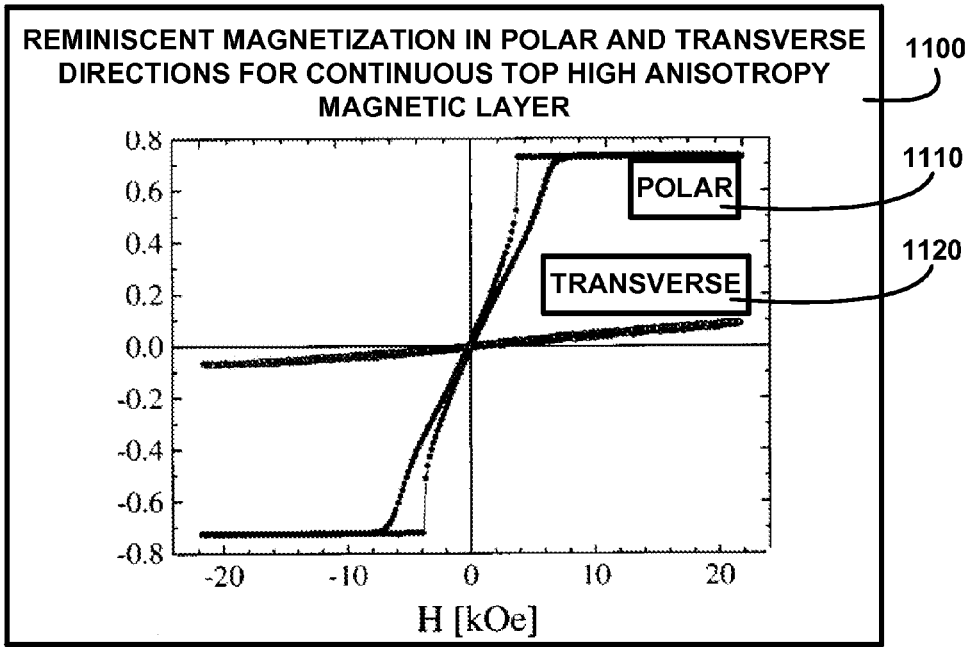
FIG. 11A shows for illustrative purposes only an example of reminiscent magnetization in polar and transverse directions for an overlying, high anisotropy, continuous magnetic layer of one embodiment.

FIG. 11A shows for illustrative purposes only an example of reminiscent magnetization (H-B loop shape) in polar and transverse directions for an overlying, high anisotropy, continuous magnetic layer of one embodiment. FIG. 11A shows a graph depicting reminiscent magnetization in polar and transverse directions for an overlying, high anisotropy, continuous magnetic layer 1100 along lines of signal values for both polar 1110 and transverse 1120 orientations configured to amplify the reminiscent magnetization of patterned magnetic features including BPM features of one embodiment.

Figure 11B:
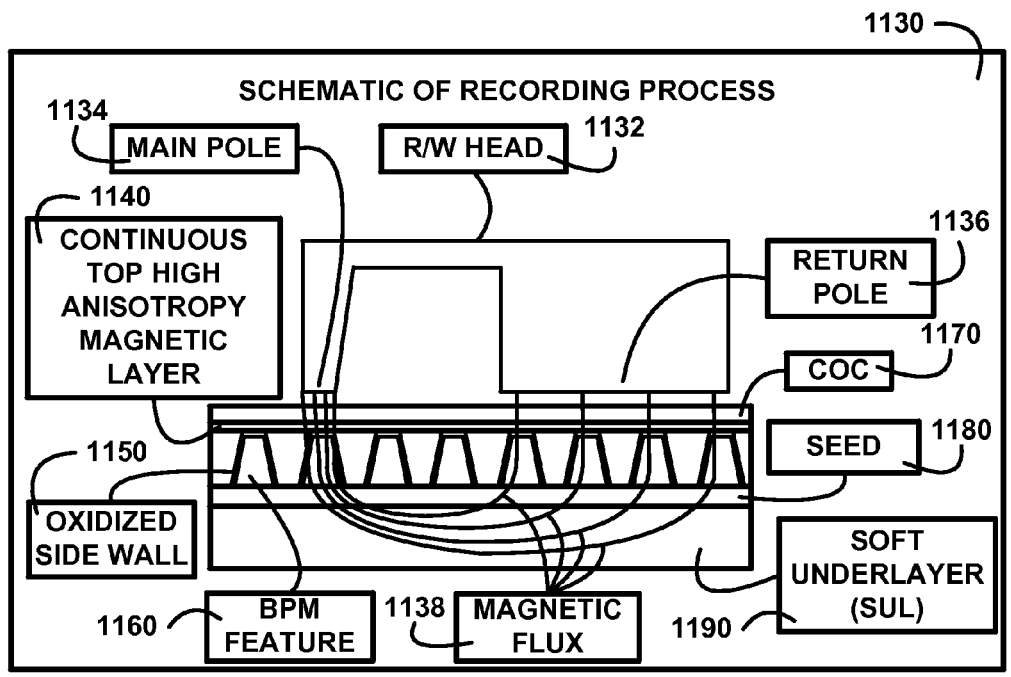
FIG. 11B shows for illustrative purposes only an example schematic of recording process of one embodiment.

FIG. 11B shows for illustrative purposes only an example schematic of recording process of one embodiment. FIG. 11B shows a schematic of recording process 1130 including a read/write or r/w head 1132 including a main pole 1134 and a return pole 1136 producing a polarized signal 1138. The magnetic flux 1138 developed by the r/w head is passed from the main pole 1134 through the COC 1170 and the overlying, high anisotropy, continuous magnetic layer 1140 and into the BPM feature 1160 with oxidized side wall 1150 protection. The magnetic flux 1128 then returns through the return pole 1136 and through the seed 1180 and the soft underlayer (SUL) 1190 of one embodiment.

The foregoing has described the principles, embodiments and modes of operation. However, the embodiments should not be construed as being limited to the particular embodiments discussed. The above described embodiments should be regarded as illustrative rather than restrictive, and it should be appreciated that variations may be made in those embodiments by workers skilled in the art without departing from the scope of the embodiments as defined by the following claims.

What is claimed is:

1. A method, comprising
   patterning features into a layer of magnetic material to form a patterned magnetic layer,
      wherein the features correspond to individual bits for perpendicular magnetic recording;
   oxidizing tops and sidewalls of the features to form oxidized tops and sidewalls of the features;
   applying a first protective material over the features;
   removing an excess of the first protective material down to at least the oxidized tops of the features to form a planarized layer;
   depositing a coupled granular/continuous layer over the planarized layer; and
   applying a second protective material over the coupled granular/continuous layer.

2. The method of claim 1,
   wherein patterning the features comprises etching the features into the layer of magnetic material through a mask configured for patterning the features.

3. The method of claim 2,
   wherein oxidizing the tops of the features also removes the mask.

4. The method of claim 1,
   wherein applying the first protective material comprises spin coating the first protective material over and in-between the features and subsequently cross-linking the first protective material.

5. The method of claim 1,
   wherein removing the excess of the first protective material comprises stopping at the oxidized tops of the features by using the oxidized tops of the features as a stop layer for removing the excess of the first protective material.

6. The method of claim 5,
   wherein the coupled granular/continuous layer comprises a low reminiscence in a polar direction and no hysteresis in a transverse direction.

7. The method of claim 1,
wherein removing the excess of the first protective material comprises removing the oxidized tops of the features to form the planarized layer.

8. A method, comprising
oxidizing tops and sidewalls of features of a patterned magnetic layer to form oxidized tops and sidewalls of the features,
wherein the features correspond to individual bits for magnetic recording;
applying a first protective material over the features;
removing an excess of the first protective material down to at least the oxidized tops of the features to form a planarized layer;
depositing a coupled granular/continuous layer over the planarized layer; and
applying a second protective material over the coupled granular/continuous layer.

9. The method of claim 8,
wherein oxidizing the tops of the features also removes an overlying carbon mask.

10. The method of claim 8,
wherein applying the first protective material comprises spin coating the first protective material over the features and subsequently cross-linking the first protective material through heat, ultraviolet light, or a combination thereof.

11. The method of claim 8,
wherein removing the excess of the first protective material comprises stopping at the oxidized tops of the features by using the oxidized tops of the features as a stop layer, and
wherein removing the excess of the first protective material comprises a process selected from chemical mechanical polishing, chemical etching, and milling.

12. The method of claim 11,
wherein the second protective material comprises a carbon overcoat.

13. The method of claim 8,
wherein removing the excess of the first protective material comprises removing the oxidized tops of the features to form the planarized layer, and
wherein removing the excess of the first protective material comprises a process selected from a group consisting of chemical mechanical polishing, chemical etching, and milling.

14. The method of claim 13,
wherein the patterned magnetic layer comprises CoCrPt, and
wherein the second protective material comprises a carbon overcoat.

15. A method, comprising
oxidizing tops of features of a patterned magnetic layer to form oxidized tops of the features;
removing an excess of an applied first protective material down to and stopping at the oxidized tops of the features to form a planarized layer; and
depositing a coupled granular/continuous layer over the planarized layer.

16. The method of claim 15,
wherein oxidizing the tops of the features also oxidizes sidewalls of the features, and
wherein the features correspond to individual bits for magnetic recording.

17. The method of claim 16,
wherein removing the excess of the first protective material comprises stopping at the oxidized tops of the features by using the oxidized tops of the features as a stop layer, and
wherein removing the excess of the first protective material comprises a process selected from a group consisting of chemical mechanical polishing, chemical etching, and milling.

18. The method of claim 16, further comprising
applying a second protective material over the coupled granular/continuous layer, wherein the second protective material comprises a carbon overcoat.

19. The method of claim 18, further comprising
applying lubricant over the second protective material, wherein the second protective material comprises a carbon overcoat.

20. The method of claim 16,
wherein oxidizing the tops of the features also removes an overlying carbon mask for etching the features into the magnetic layer.

* * * * *